United States Patent [19]
Wadell

[11] Patent Number: 5,643,361
[45] Date of Patent: Jul. 1, 1997

[54] PARTICULATE COATING APPARATUS WITH PARTICULATE CONTROL DEVICE

[75] Inventor: Lars Gustaf Albert Wadell, Aengelholm, Sweden

[73] Assignee: Nestec S.A., Vevey, Switzerland

[21] Appl. No.: 865,792

[22] Filed: Apr. 7, 1992

Related U.S. Application Data

[63] Continuation of Ser. No. 547,457, Jul. 3, 1990, abandoned.

[30] Foreign Application Priority Data

Aug. 1, 1989 [EP] European Pat. Off. ............ 89114174

[51] Int. Cl.$^6$ ........................................... A23G 9/24
[52] U.S. Cl. ........................ 118/16; 118/18; 118/24; 118/312; 99/494
[58] Field of Search ........................ 118/477, 16, 18, 118/24, 312, 22; 426/289, 292; 99/494

[56] References Cited

U.S. PATENT DOCUMENTS

| | | |
|---|---|---|
| 2,865,766 | 12/1958 | Christianson et al. . |
| 3,036,533 | 5/1962 | Burt et al. . |
| 3,045,640 | 7/1962 | Hill et al. .................................. 118/16 |
| 3,404,659 | 10/1968 | Croston . |
| 3,547,075 | 12/1970 | Johnson . |
| 3,779,205 | 12/1973 | Kuhlman ................................. 118/16 |
| 3,870,013 | 3/1975 | Wagner .................................... 118/24 |
| 3,885,519 | 5/1975 | Orlowski .................................. 118/16 |
| 3,934,545 | 1/1976 | Schady ..................................... 118/19 |
| 4,248,173 | 2/1981 | Kuhlman ................................. 118/24 |
| 4,333,415 | 6/1982 | Miller et al. ............................. 118/16 |
| 4,497,244 | 2/1985 | Koppens .................................. 118/16 |
| 4,762,083 | 8/1988 | Wadell ..................................... 118/16 |
| 4,808,424 | 2/1989 | Wadell ..................................... 426/289 |
| 4,846,097 | 7/1989 | Hansson ................................... 118/16 |

*Primary Examiner*—Anthony J. Weier
*Attorney, Agent, or Firm*—Vogt & O'Donnell, LLP

[57] ABSTRACT

A plate which is adjustable is positioned in an apparatus for coating a foodstuff with particulate material to control an amount of particulate material falling from a first belt of a conveyor to an inclined portion of a second belt of the conveyor beneath the first belt. To control the amount of material, the plate is positioned below a horizontal run of the first belt and above the inclined portion of the second belt. The material deposited on the inclined portion of the second belt is conveyed to a horizontal upper run of the second belt and provides a layer of material for coating a foodstuff transported from the horizontal upper run of the first belt to the horizontal upper run of the second belt.

7 Claims, 2 Drawing Sheets ically 5,643,361

PARTICULATE COATING APPARATUS WITH PARTICULATE CONTROL DEVICE

CROSS REFERENCE TO RELATED APPLICATION

This application is a continuing application of application Ser. No. 07/547,457, filed Jul. 3, 1990, now abandoned.

The present invention relates to an apparatus and method of coating a foodstuff with a particulate material.

BACKGROUND OF THE INVENTION

Normally, during the coating of foodstuffs with particulate material, large amounts of coating material fall off the foodstuff during the coating process, and it is important that this excess coating material is reused. In conventional equipment used, for example, in coating frozen fish on both sides with breadcrumbs, excess coating material is normally transported upwards for reuse by means of elevator screws. However, not only are delicate crumbs damaged by screws, but also large amounts of coating material are always in circulation and exposed to the warm air of the environment which is not desirable since it is important that the coating material should be maintained at as low a temperature as possible. In addition, in the coating of some products using conveyor belts, e.g., ice cream with crumbs, it is desirable to adjust the thickness of the upper and lower layer independently. For instance, if the lower layer is too thick, there may be too many crumbs in circulation which could cause problems with the tightness of the system. Therefore, even nowadays, coating of certain products with particulate material is carried out manually.

In our U.S. Pat. No. 4,762,083, a completely new principle is described for coating a foodstuff with a particulate material using an apparatus which is not only very much simpler but also enables very much smaller amounts of coating material to be in circulation at any period in time when compared with conventional apparatus. This apparatus comprises:

a drum capable of rotating about a substantially horizontal longitudinal axis; p1 a first horizontal conveyor adapted to travel through the drum;

a second horizontal conveyor below the first conveyor, adapted to travel in a direction opposite the first conveyor, the second conveyor comprising at least first, second and third successive endless belts each having a horizontal upper run and a gap between each successive pair of belts, the second belt having an inclined portion extending to a position below the first belt, the gap between the second and third belts being situated within the drum;

means for feeding particulate material onto the first conveyor; and means for feeding a foodstuff onto the first belt; such that in operation, particulate material is fed from the first conveyor onto the foodstuff on the first belt for coating the foodstuff on an upper side, the coated foodstuff is transported to the second belt with excess particulate material falling off the first belt onto the inclined portion of the second belt and is conveyed to the horizontal upper run of the second belt to form a layer on which the coated foodstuff lies after being transported from the first belt to the horizontal upper run of the second belt for coating the foodstuff on a bottom side, the coated foodstuff is fed to the third belt with further particulate material falling through the gap between the second and third belts onto an inside wall of the drum which rotates for conveying the further material to a position above the first conveyor upon which the further material falls by gravity, and the first conveyor transports the further material back to the second conveyor.

However, although this apparatus enables the foodstuff to be coated on both sides, there can be problems with the tightness of the system due to the presence of too many crumbs in circulation which is caused by the formation of a layer of particulate material on the second belt of the second horizontal conveyor which is much too thick.

SUMMARY OF THE INVENTION

It has been found that the thickness of the layer of particulate material on the second belt of the second horizontal conveyor can be controlled independently of the thickness of the particulate material on the upper surface of the foodstuff by means of an adjustable plate positioned beneath the upper run of the first belt of the second conveyor to control the amount of particulate material from the first belt and deposited onto the inclined portion of the second belt of the second conveyor.

Accordingly, the present invention provides an apparatus for coating a foodstuff with particulate material comprising:

a drum capable of rotating about a substantially horizontal longitudinal axis;

a first conveyor adapted to travel through the drum;

a second conveyor below the first conveyor, the second conveyor comprising at least first, second and third successive endless belts each having a substantially horizontal upper run and a gap between each successive pair of belts, the second belt having an inclined portion extending to a position below the first belt, the gap between the second and third belts being situated within the drum;

means for feeding particulate material onto the first conveyor; and means for feeding a foodstuff onto the first belt; such that in operation, particulate material is fed from the first conveyor onto the foodstuff on the first belt for coating the foodstuff on an upper side, the coated foodstuff is transported to the second belt with excess particulate material falling off the first belt onto the portion of the second belt below the first belt and is conveyed to the substantially horizontal upper run of the second belt to form a layer on which the coated foodstuff lies after being transported from the first belt to the substantially horizontal upper run of the second belt for coating the foodstuff on a bottom side, the coated foodstuff is fed to the third belt with further particulate material falling through the gap between the second and third belts onto an inside wall of the drum which rotates for conveying the further material to a position above the first conveyor upon which the further material falls by gravity, and the first conveyor transports the further material back to the second conveyor characterised in that an adjustable plate is positioned beneath the level of the upper run of the first belt of the second conveyor to control the amount of particulate material falling from the first belt and deposited onto the portion of the second belt of the second conveyor which lies below the first belt of the second conveyor.

Advantageously, there is a means positioned below the second conveyor for collecting the excess particulate material which does not fall and become deposited onto the portion of the second belt lying below the first belt of the second conveyor so that it may be recirculated. For example, this means may be a further conveyor which transports the excess particulate material back to the inside wall of the drum.

DETAILED DESCRIPTION OF THE INVENTION

In the apparatus of the present invention, the adjustable plate is conveniently adjustable automatically and is preferably pivoted at its upper end and may be adjusted to the appropriate angle to provide the desired amount of particulate material falling onto the portion of the second belt lying below the first belt of the second conveyor. It is sometimes advantageous to have more than one adjustable plate present for better control, e.g., two adjustable plates.

Conveniently, the width of the adjustable plate is approximately equal to the width of the first belt.

The adjustable plate is conveniently positioned above the upstream extremity of the second belt of the second conveyor.

The first belt of the second conveyor may be solid or it may be perforated with a solid stationary plate mounted beneath it so that all excess particulate material falls off the leading edge. In this case, advantageously there is an additional belt having a horizontal upper run located between the first and second belts above the portion of the second belt below the first belt, there being a gap between the additional belt and the first belt and the upper run of the second belt, such that the foodstuff coated on the upper side is transported from the first belt onto the additional belt and then to the second belt with excess particulate material falling through the gap between the first and additional belt. In this case, the adjustable plate is positioned beneath the gap between the additional belt and the first belt of the upper run of the second conveyor.

Alternatively; the first belt of the second conveyor may be perforated to enable excess particulate material to fall through the perforations. In this case, the adjustable plate may be positioned between the upper and lower runs inside the first belt. Any belt containing gaps or apertures is suitable, but a wire mesh belt is especially preferred. The perforations may have a pitch up to 2.5 cm or more depending upon the size of the particulate material.

The second and third belts of the lower horizontal conveyor are preferably solid belts substantially without perforations or perforated belts with a solid plate mounted beneath the upper run. If desired, one or more belts may be provided which succeed the third belt to carry the coated food product away.

The first conveyor is conveniently substantially horizontal and is preferably an endless belt substantially without perforations. The fresh particulate material, together with that which has fallen by gravity from the upper inside surface of the drum is conveniently transported to an extremity of the first conveyor from where it is transported onto the foodstuff travelling on the first belt of the conveyor below. Conveniently, the first conveyor is adapted to vibrate. When the first conveyor is an endless belt, the vibration may conveniently be achieved by means of a triangular roller situated beneath and in contact with the upper run between the two end rollers. This enables a more even distribution of the particulate material. Advantageously, the first conveyor is adapted to travel in a direction opposite to the second conveyor.

In some cases, a vibrator is positioned between the first and second conveyors to receive the particulate material which falls off the extremity of the first conveyor to distribute it onto the foodstuff travelling on the lower conveyor.

The thickness of the particulate material falling from the first conveyor onto the first belt of the second conveyor may be controlled within wide limits, e.g., 20–30 mm for fish sticks or 50–70 mm for ice cream.

Conveniently; the inside wall of the drum is partitioned by means of plates extending radially from the circumference defining peripherally adjacent and inwardly opening pockets. Advantageously, positioned adjacent and spaced from the inside wall of the drum, and separated from the wall of the drum by the radial plates if these are present, is an arcuate stationary baffle plate for retaining the particulate material which has fallen through the gap between the second and third belts onto the inside wall of the rotating drum. The baffle plate extends from the approximate level of the second conveyor within the drum to a position above the first conveyor where the upper part of the baffle plate is profiled to enable the particulate material carried by the rotating drum to be distributed evenly over the width of the first conveyor.

The foodstuff may be any foodstuff which may be coated with particulate material, for example, chocolate, confectionery, ice cream, vegetables, meat or fish. In some cases, before being coated; the foodstuff is conveniently treated to enable the particulate material to adhere to the foodstuff. For example, an adhesive surface may be formed on confectionery articles by heating or by the application of a binding agent; while fish may be battered. In the case of ice cream, a sticky surface may be formed by infrared or steam heating.

The particulate material may be any kind of crumb, granular or powdery material such as bread or confectionery crumbs, nut splinters, flour, starch, nuts, raisins, sugar crystals, shredded cheese, or particulate material from dehydrated potato, for example, potato flakes, potato powder or potato granules.

The present invention also provides a method for coating a foodstuff with a particulate material comprising:
  transporting particulate material on a first substantially horizontal conveyor;
  transporting a foodstuff on a second substantially horizontal conveyor positioned below the first conveyor in a direction opposite that of the first conveyor, the second conveyor comprising at least first, second and third successive endless belts each having a substantially horizontal upper run and a gap between each successive pair of belts, the second belt having an inclined portion extending to a position below the first belt;
  feeding the particulate material from the first conveyor onto the foodstuff on the first belt for coating the foodstuff on an upper side;
  transporting the coated foodstuff to the upper run of the second belt while particulate material falls off the first belt onto the portion of the second belt lying below the first belt for being conveyed from the inclined portion to the horizontal upper run of the second belt for forming a layer onto which the coated foodstuff is transported for being coated on a bottom side after being transported from the first belt to the upper run of the second belt;
  transporting the coated foodstuff to the third belt with particulate material falling through the gap between the second and third belts onto an inside wall of a drum through which the first and second conveyors travel; and rotating the drum for transporting the particulate material to a position above the first conveyor upon which the particulate material falls by gravity characterised in that the amount of particulate material falling from the first belt and deposited onto the portion of the second belt of the second conveyor which lies below the first belt of the second conveyor is controlled by an adjustable plate positioned beneath the upper run of the first belt of the second conveyor.

BRIEF DESCRIPTION OF THE DRAWINGS

The present invention will now be further illustrated by way of example with reference to the following drawings.

FIG. 4 is a sectional side view of part of the apparatus where the first belt of the second conveyor is a single perforated belt.

DETAILED DESCRIPTION OF THE DRAWINGS

Figure 1:
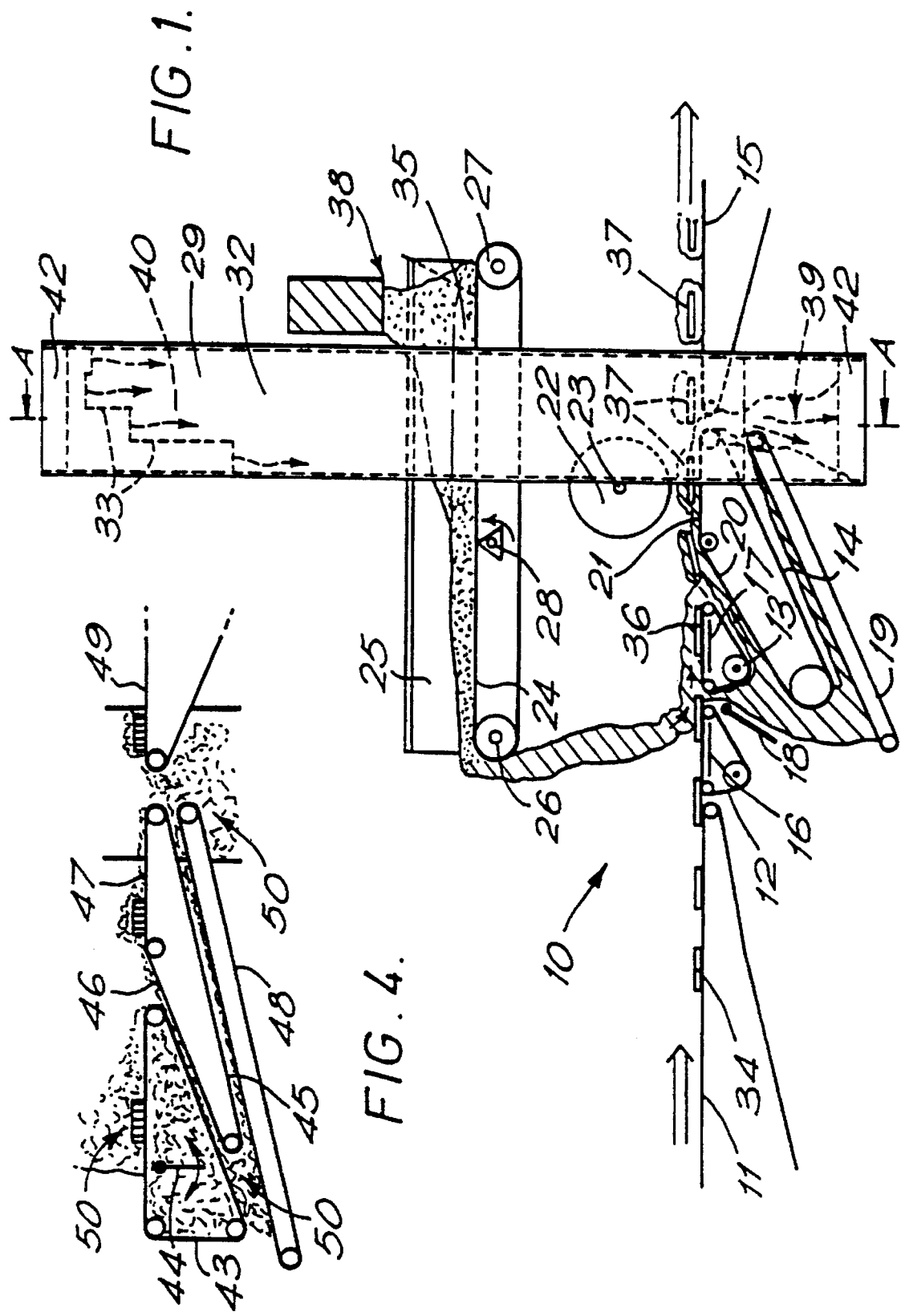
FIG. 1 is a sectional side view of the apparatus.

Referring to the drawings, the apparatus generally designated 10 comprises a horizontal conveyor for transporting a foodstuff, consisting of a solid belt 11, wire mesh belts 12 and 13 and solid belts 14 and 15. Beneath the upper runs of wire belts 12 and 13 are stationary solid plates 16,17. Beneath the gap between wire belts 12 and 13 is a pivoted adjustable plate 18 and beneath belt 14 is a further solid belt 19. The upper run of solid belt 14 has an inclined portion 20 and a horizontal portion 21. Positioned above the horizontal portion 21 of the upper run of solid belt 14 is a pressure roller 22 turning on an axle 23.

Situated above the vibrator and pressure roller is a horizontal solid endless conveyor belt 24 provided with side walls 25 trained around rollers 26 and 27 and having a triangular roller 28 underneath the upper run positioned so that the angles contact the upper run as it rotates.

A rotating drum 29 driven by drive rollers 30, 31 is positioned so that the horizontal portion 20 of the upper run of belt 14 as well as part of belts 15 and 25 travel through it. Positioned adjacent the inside wall of the drum 29 is a stationary baffle plate 32, the upper end of which 33 is designed to allow particulate material to be discharged evenly over the width of the belt 24. Other suitable designs of the upper end of the baffle plate will be readily apparent to a person skilled in the art.

Also illustrated in the drawings are battered frozen fish portions 34, potato cubes 35, battered frozen fish portions coated on top with potato cubes 36, battered frozen fish portions coated completely with potato cubes 37, means 38 whereby potato cubes are continuously added to the upper run of the belt 24, and arrows indicating the fall of potato cubes inside the drum 39 and 40.

The inside wall of the drum is partitioned by means of radially disposed plates 41 and parallel sides 42 defining peripherally adjacent and inwardly opening pockets which carry the potato cubes 35.

FIG. 4 illustrates a perforated belt 43, the perforations being large enough to allow the potato cubes to pass through, beneath the upper run of which is a pivotable plate 44 positioned above the upstream extremity of the second belt 45 of the second conveyor with an inclined upper run 46 and a horizontal upper run 47, a solid belt 48, and a solid belt 49, the potato cubes being generally designated 50.

In operation, the upper runs of wire mesh belts 11, 12 and 13, solid belts 14 and 15, the belt 24, and the rotating drum 29 travel in the direction indicated by the arrows.

Battered frozen fish portions 34, each weighing 50 g are fed from a battering machine (not shown) on belt 11. Fresh potato cubes 35 having dimensions of 3 mm×3 mm×7 mm are fed continuously from a means 38 on to the conveyor belt 24 which vibrates by means of the rotation of the triangular roller 28. The potato cubes are transported to the end of the belt which is trained around roller 26 where they fall off and fall onto the fish portions which are lying on belt 12, to give frozen fish portions coated on top 36. Excess potato cubes fall between belts 12 and 13 where a certain proportion is guided and being deposited onto the inclined portion 20 by the appropriate adjustment of the pivoted plate 18, the remainder falling onto the upper run of belt 19. The thickness of the layer of potato cubes on the inclined portion 20 is monitored by a sensor (not shown) and the pivoted plate is adjusted by the sensor automatically to the appropriate angle in order to provide the desired thickness of potato cubes on the inclined portion 20. The excess potato cubes which fall on the inclined portion 20 are transported on the inclined portion 20 of the upper run of solid belt 14 in the direction of the arrow to the horizontal portion 21 where the frozen fish portions coated on top travel from belt 13 to lie on the excess potato cubes so that they become completely coated fish portions 37, and pass under the pressure roller 22.

The excess potato cubes which have fallen onto the belt 19 and the completely coated fish portions 37 on the horizontal portion 21 of belt 14 then pass through the rotating drum 29. Inside the drum excess potato cubes 35 on the horizontal portion 21 of belt 14 fall through the gap between belts 14 and 15 and the excess potato cubes on the belt 19 fall off the downstream end of the belt 19 and are guided by a device such as described in application Ser. No. 07/556,651 in a path indicated by the arrows 39 to cover the axial width of the lower part of the inside wall of the drum and travel upwards on the inside wall within the pockets defined by the plates 41 and the parallel sides 42 and supported by the stationary plate 32, until they reach a position above the belt 24 where, indicated by the arrows 40, they fall onto the belt 24 and spread in an even manner owing to the design of the upper end 33 of the plate 32. There, they are transported, along with potato cubes fed by means 38, to be recirculated by falling off the end of the belt trained around roller 26 and onto the battered fish portions 34.

After emerging from the inside of the rotating drum 29 on the wire belt 15, the completely coated fish portions are transported to a fryer (not shown) and then deep-frozen.

Figure 2:
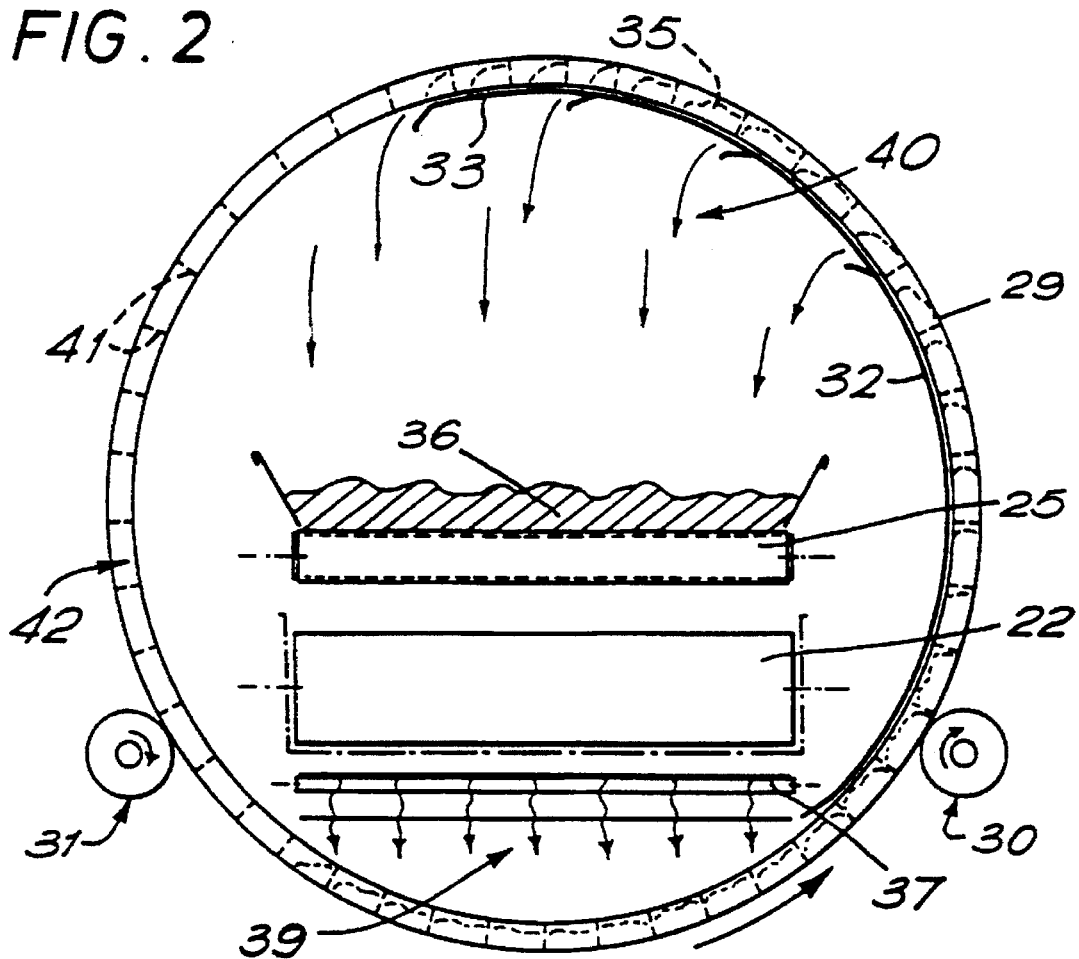
FIG. 2 is a transverse section through the drum along the line A—A in FIG. 1.
Figure 3:
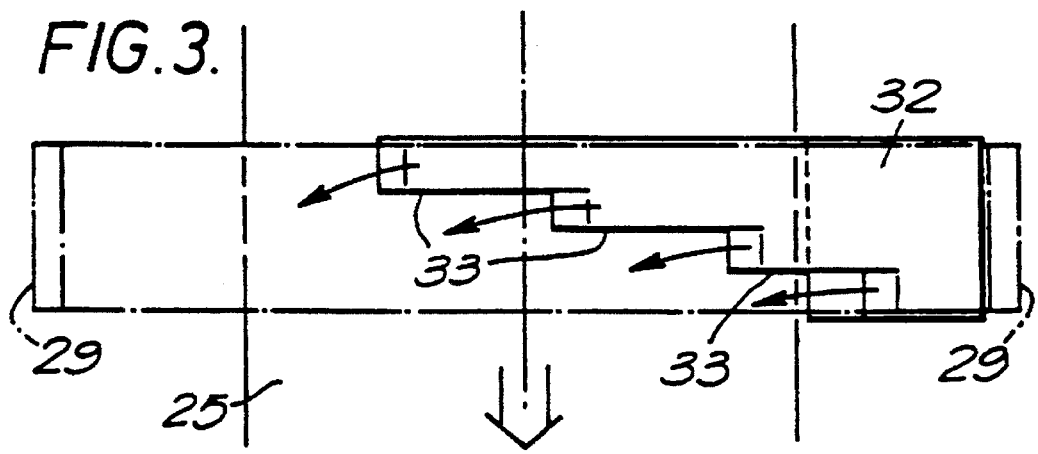
FIG. 3 is a top plan view of the upper end of a stationary plate positioned adjacent the inside wall of the drum.

In the embodiment shown in FIG. 4, instead of belts 12 and 13 with solid plates 16,17 where excess potato cubes fall through the gap between belts 12 and 13, the excess potato cubes 50 fall through the perforations of the single perforated belt 43 where a certain proportion is guided automatically onto the inclined upper run 46 of the second belt 45 by the appropriate adjustment of the pivoted plate 44, the remainder falling onto the upper run of belt 49. The excess potato cubes are then transported to the drum for recirculation in the same manner as described in relation to FIGS. 1 to 3 while the coated fish portions are transported to a fryer and deep-frozen.

I claims:

1. An apparatus for coating a foodstuff with particulate material comprising:

a drum capable of rotating about a substantially horizontal longitudinal axis;

a first conveyor positioned to travel to convey material through the drum;

a second conveyor positioned below the first conveyor to travel to convey material through the drum in a direction substantially opposite the first conveyor, the second conveyor comprising at least first, second and third successive endless belts, each having a horizontal upper run, and a gap between each successive pair of belts, the second belt having an inclined portion extending from its horizontal upper run towards the first belt and terminating at an end position below the horizontal upper run of the first belt such that at least a portion of an amount of material falling from the first belt is deposited upon the inclined portion of the second belt, the gap between the second and third belts being situated within the drum;

a plate which is adjustable and which is positioned at a position below the horizontal upper run of the first belt and above the inclined portion of the second belt to guide the particulate material falling from the first belt and to control an amount of particulate material falling from the first belt which is deposited upon the inclined portion of the second belt;

means for feeding particulate material onto the first conveyor; and means for feeding a foodstuff onto the first belt;

such that in operation:

particulate material is fed from the first conveyor onto a foodstuff on the horizontal upper run of the first belt for coating the foodstuff on an upper side;

the coated foodstuff is transported to the horizontal upper run of the second belt with excess particulate material falling from the first belt;

the plate is adjusted to guide the excess particulate material falling from the first belt and to control the amount of falling particulate material deposited upon the inclined portion of the second belt and wherein the excess particulate material deposited upon the inclined portion of the second belt forms a layer of particulate material which is conveyed to the horizontal upper run of the second belt on which the coated foodstuff lies after being transported from the horizontal upper run of the first belt to the horizontal upper run of the second belt for coating the foodstuff on a bottom side;

the coated foodstuff is fed to the horizontal upper run of the third belt with further particulate material falling through the gap between the second and third belts onto an inside wall of the drum which rotates for conveying the further material to a position above the first conveyor upon which the further material falls by gravity; and the first conveyor transports the further material back to the second conveyor.

2. An apparatus according to claim 1 further comprising an additional conveyor positioned below the inclined portion of the second belt and the adjustable plate for collecting the excess particulate material not deposited onto the second belt from the first belt.

3. An apparatus according to claim 2 wherein the additional conveyor extends to within the drum for conveying the excess particulate material which the additional conveyor collects to the inside wall of the drum.

4. An apparatus according to claim 1 wherein the first belt is perforated.

5. An apparatus according to claim 4 wherein the first belt is perforated to enable excess particulate material to fall through perforations of the perforated belt and wherein the adjustable plate is positioned between the horizontal upper run of the first belt and a lower run of the first belt.

6. An apparatus according to claim 1, 2, 3, 4, or 5 further comprising an additional belt having a horizontal upper run located between the first and second belts and above the inclined portion of the second belt, there being a gap between the horizontal runs of the first, additional, and second belts, such that the foodstuff is transported from the first belt onto the additional belt and then to the second belt with excess particulate material falling through the gaps between the first, additional and second belts onto the inclined portion of the second belt, the adjustable plate being positioned to control the amount of particulate material falling between the first and additional belts which is deposited upon the inclined portion of the second belt.

7. An apparatus according to claim 4 wherein the adjustable plate is pivoted for adjustment about its horizontal upper edge.

* * * * *